US012656978B2

(12) United States Patent
Thatcher et al.

(10) Patent No.: US 12,656,978 B2
(45) Date of Patent: Jun. 16, 2026

(54) MULTIPLE HOST MEMORY CONTROLLER

(71) Applicant: Cryptography Research, Inc., San Jose, CA (US)

(72) Inventors: Thomas J. Thatcher, Sunnyvale, CA (US); Bryan Jason Wang, South Lake Tahoe, CA (US)

(73) Assignee: Cryptography Research, Inc., San Jose, CA (US)

( * ) Notice: Subject to any disclaimer, the term of this patent is extended or adjusted under 35 U.S.C. 154(b) by 0 days.

(21) Appl. No.: 18/902,102

(22) Filed: Sep. 30, 2024

(65) Prior Publication Data

US 2025/0094087 A1     Mar. 20, 2025

Related U.S. Application Data

(63) Continuation of application No. 17/987,092, filed on Nov. 15, 2022, now Pat. No. 12,131,067.

(60) Provisional application No. 63/317,196, filed on Mar. 7, 2022, provisional application No. 63/281,315, filed on Nov. 19, 2021.

(51) Int. Cl.
*G06F 3/06* (2006.01)

(52) U.S. Cl.
CPC .......... *G06F 3/0659* (2013.01); *G06F 3/0604* (2013.01); *G06F 3/0656* (2013.01); *G06F 3/0673* (2013.01)

(58) Field of Classification Search
CPC ..... G06F 3/0659; G06F 3/0656; G06F 3/0673
See application file for complete search history.

(56) References Cited

U.S. PATENT DOCUMENTS

| | | | |
|---|---|---|---|
| 5,485,592 | A | 1/1996 | Lau |
| 5,745,707 | A | 4/1998 | Takahashi |
| 5,915,099 | A | 6/1999 | Takata et al. |
| 6,654,835 | B1 | 11/2003 | Foster et al. |
| 6,678,838 | B1 | 1/2004 | Magro |

(Continued)

FOREIGN PATENT DOCUMENTS

| | | |
|---|---|---|
| EP | 1708091 A1 | 10/2006 |
| WO | WO-2014-074255 A1 | 5/2014 |

OTHER PUBLICATIONS

Leary, Glenn et al., "Performance and Resource Optimization of NoC Router Architecture for Master and Slave IP Cores", Arizona State University, Department of CSE, Downloaded on Nov. 11, 2021 at: http://www.cecs.uci.edu/~papers/esweek07/codes/p155. pdf. 6 pages.

*Primary Examiner* — Edward J Dudek, Jr.
(74) *Attorney, Agent, or Firm* — The Neudeck Law Firm, LLC

(57) ABSTRACT

Multiple (e.g., two) hosts access a single memory channel (and/or device) via a memory controller. The single memory channel/device can support at most one access at a time. To reduce contention between the multiple hosts, the memory controller comprises multiple (e.g., two), independent, host ports. Each host port is associated with a write buffer(s) in the memory controller that stores write data at least until the memory controller writes the data to the memory channel. Data stored in a write buffer may be used to respond to memory access commands (e.g., reads or writes) on the ports without accessing the memory channel. In this manner, the hosts do not directly contend with each other for the single memory channel or the memory controller.

18 Claims, 7 Drawing Sheets

(56) References Cited

U.S. PATENT DOCUMENTS

| | | | |
|---|---|---|---|
| 6,874,044 B1 | 3/2005 | Chou et al. | |
| 6,904,474 B1 | 6/2005 | Robertson | |
| 9,032,162 B1 | 5/2015 | Chang et al. | |
| 12,131,067 B2 * | 10/2024 | Thatcher | G06F 3/0656 |
| 2003/0181994 A1 | 9/2003 | Mizoguchi | |
| 2004/0107265 A1 | 6/2004 | Yasunaga | |
| 2008/0126620 A1 | 5/2008 | Vashisth et al. | |
| 2009/0172261 A1 | 7/2009 | Prins et al. | |
| 2009/0172262 A1 * | 7/2009 | Olbrich | G06F 12/0246 |
| | | | 711/E12.001 |
| 2011/0029732 A1 * | 2/2011 | Kobayashi | G06F 3/061 |
| | | | 711/E12.001 |
| 2015/0067254 A1 * | 3/2015 | Albini | G06F 3/0665 |
| | | | 711/114 |
| 2016/0034188 A1 * | 2/2016 | Bisht | G06F 3/0655 |
| | | | 710/53 |
| 2016/0306744 A1 * | 10/2016 | Kampe | G06F 11/00 |
| 2020/0225851 A1 * | 7/2020 | Klein | G06F 11/1012 |
| 2021/0200470 A1 * | 7/2021 | Chan | G06F 3/0656 |
| 2021/0263866 A1 * | 8/2021 | Norman | G06F 13/1668 |

* cited by examiner

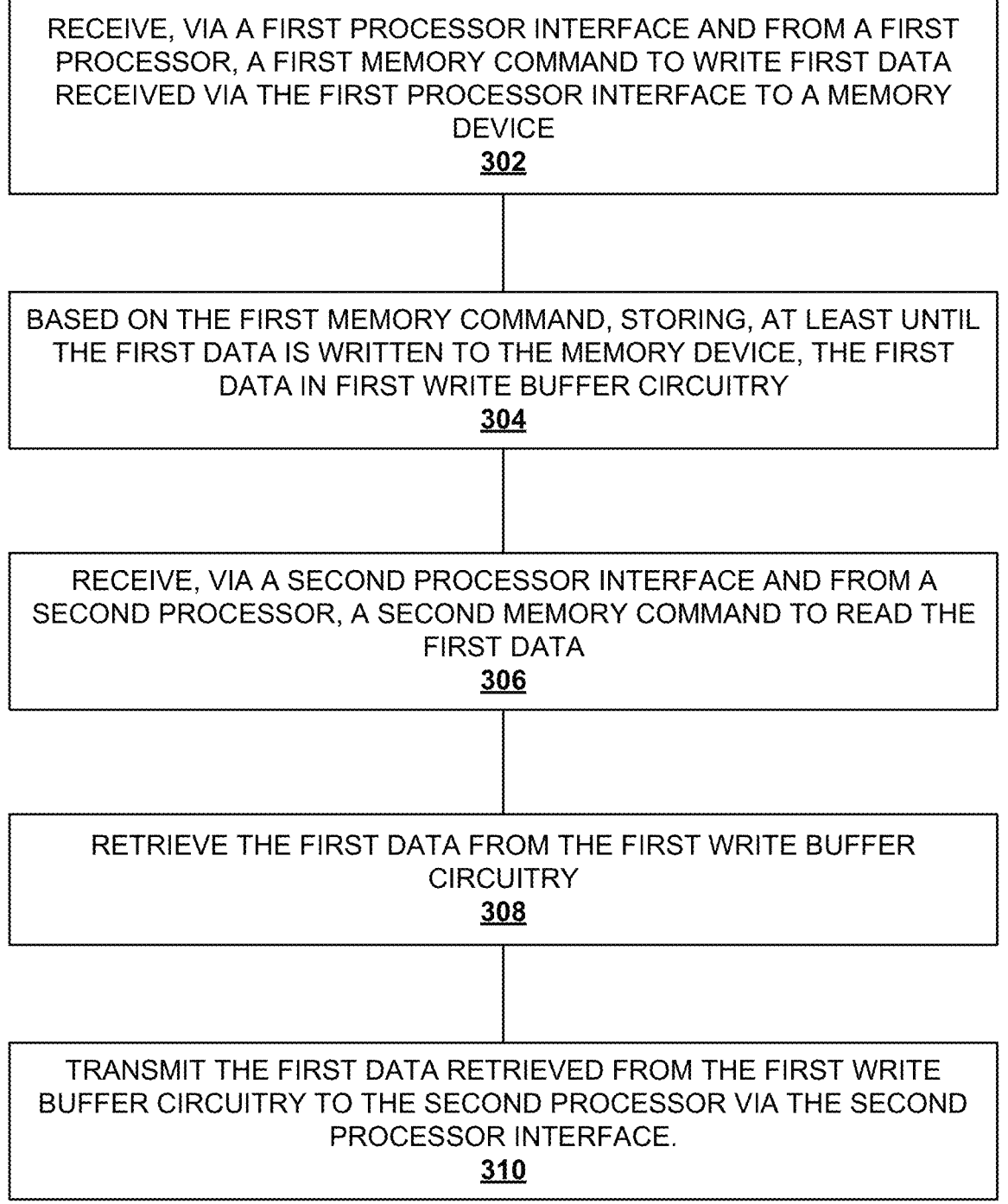

RECEIVE, VIA A FIRST PROCESSOR INTERFACE AND FROM A FIRST PROCESSOR, A FIRST MEMORY COMMAND TO WRITE FIRST DATA RECEIVED VIA THE FIRST PROCESSOR INTERFACE TO A MEMORY DEVICE
302

BASED ON THE FIRST MEMORY COMMAND, STORING, AT LEAST UNTIL THE FIRST DATA IS WRITTEN TO THE MEMORY DEVICE, THE FIRST DATA IN FIRST WRITE BUFFER CIRCUITRY
304

RECEIVE, VIA A SECOND PROCESSOR INTERFACE AND FROM A SECOND PROCESSOR, A SECOND MEMORY COMMAND TO READ THE FIRST DATA
306

RETRIEVE THE FIRST DATA FROM THE FIRST WRITE BUFFER CIRCUITRY
308

TRANSMIT THE FIRST DATA RETRIEVED FROM THE FIRST WRITE BUFFER CIRCUITRY TO THE SECOND PROCESSOR VIA THE SECOND PROCESSOR INTERFACE.
310

*FIG. 3*

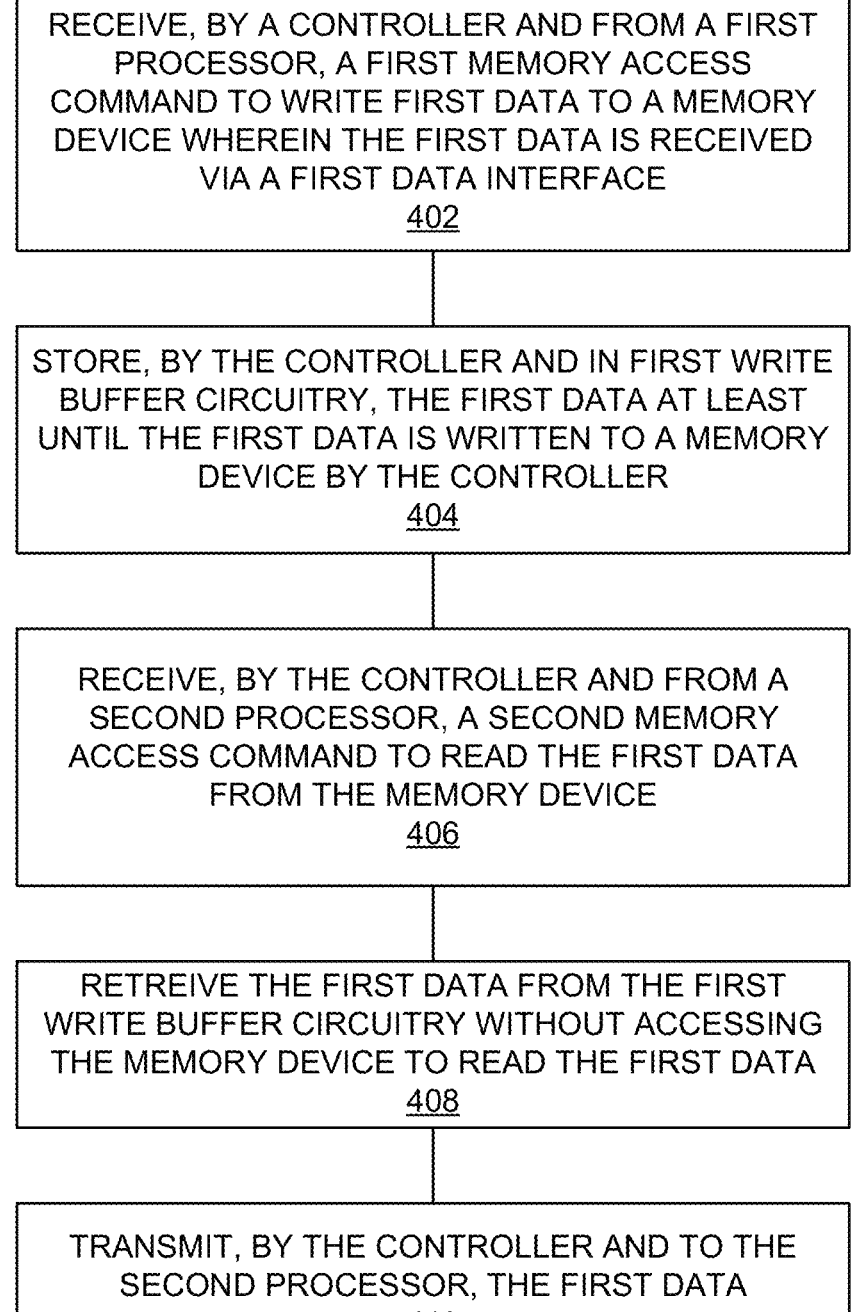

RECEIVE, BY A CONTROLLER AND FROM A FIRST PROCESSOR, A FIRST MEMORY ACCESS COMMAND TO WRITE FIRST DATA TO A MEMORY DEVICE WHEREIN THE FIRST DATA IS RECEIVED VIA A FIRST DATA INTERFACE
402

STORE, BY THE CONTROLLER AND IN FIRST WRITE BUFFER CIRCUITRY, THE FIRST DATA AT LEAST UNTIL THE FIRST DATA IS WRITTEN TO A MEMORY DEVICE BY THE CONTROLLER
404

RECEIVE, BY THE CONTROLLER AND FROM A SECOND PROCESSOR, A SECOND MEMORY ACCESS COMMAND TO READ THE FIRST DATA FROM THE MEMORY DEVICE
406

RETREIVE THE FIRST DATA FROM THE FIRST WRITE BUFFER CIRCUITRY WITHOUT ACCESSING THE MEMORY DEVICE TO READ THE FIRST DATA
408

TRANSMIT, BY THE CONTROLLER AND TO THE SECOND PROCESSOR, THE FIRST DATA
410

*FIG. 4*

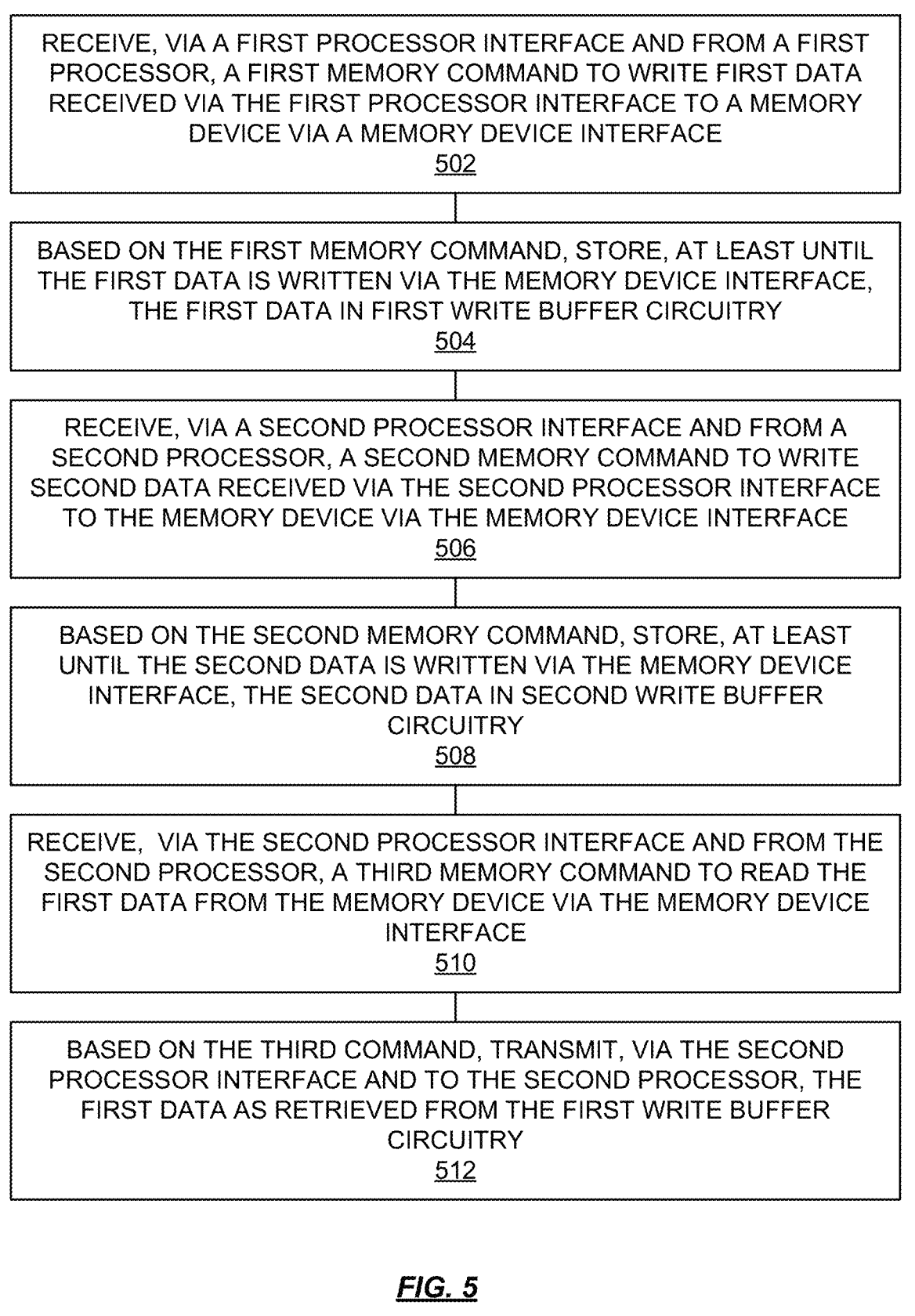

RECEIVE, VIA A FIRST PROCESSOR INTERFACE AND FROM A FIRST PROCESSOR, A FIRST MEMORY COMMAND TO WRITE FIRST DATA RECEIVED VIA THE FIRST PROCESSOR INTERFACE TO A MEMORY DEVICE VIA A MEMORY DEVICE INTERFACE
502

BASED ON THE FIRST MEMORY COMMAND, STORE, AT LEAST UNTIL THE FIRST DATA IS WRITTEN VIA THE MEMORY DEVICE INTERFACE, THE FIRST DATA IN FIRST WRITE BUFFER CIRCUITRY
504

RECEIVE, VIA A SECOND PROCESSOR INTERFACE AND FROM A SECOND PROCESSOR, A SECOND MEMORY COMMAND TO WRITE SECOND DATA RECEIVED VIA THE SECOND PROCESSOR INTERFACE TO THE MEMORY DEVICE VIA THE MEMORY DEVICE INTERFACE
506

BASED ON THE SECOND MEMORY COMMAND, STORE, AT LEAST UNTIL THE SECOND DATA IS WRITTEN VIA THE MEMORY DEVICE INTERFACE, THE SECOND DATA IN SECOND WRITE BUFFER CIRCUITRY
508

RECEIVE, VIA THE SECOND PROCESSOR INTERFACE AND FROM THE SECOND PROCESSOR, A THIRD MEMORY COMMAND TO READ THE FIRST DATA FROM THE MEMORY DEVICE VIA THE MEMORY DEVICE INTERFACE
510

BASED ON THE THIRD COMMAND, TRANSMIT, VIA THE SECOND PROCESSOR INTERFACE AND TO THE SECOND PROCESSOR, THE FIRST DATA AS RETRIEVED FROM THE FIRST WRITE BUFFER CIRCUITRY
512

*FIG. 5*

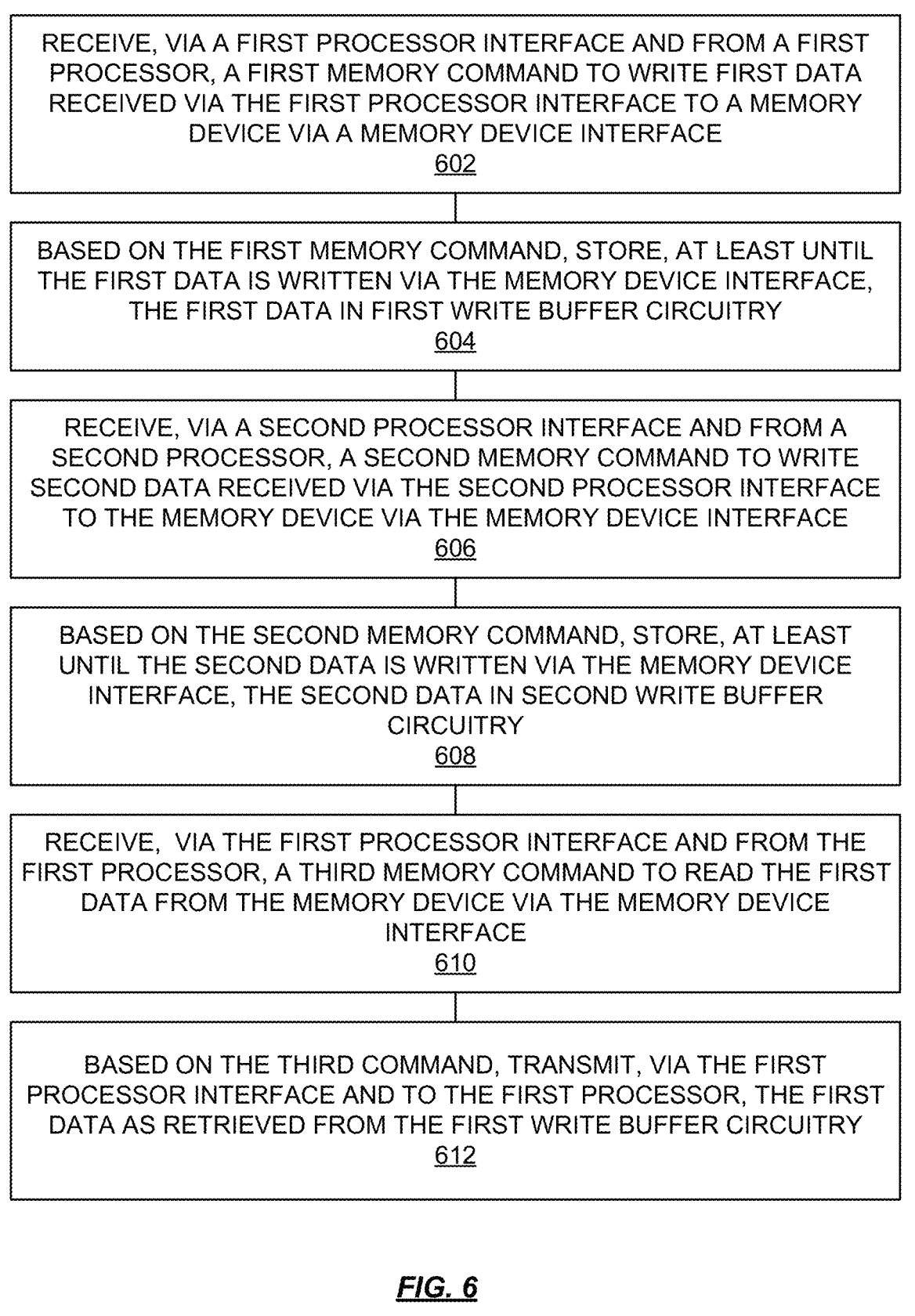

RECEIVE, VIA A FIRST PROCESSOR INTERFACE AND FROM A FIRST PROCESSOR, A FIRST MEMORY COMMAND TO WRITE FIRST DATA RECEIVED VIA THE FIRST PROCESSOR INTERFACE TO A MEMORY DEVICE VIA A MEMORY DEVICE INTERFACE
602

BASED ON THE FIRST MEMORY COMMAND, STORE, AT LEAST UNTIL THE FIRST DATA IS WRITTEN VIA THE MEMORY DEVICE INTERFACE, THE FIRST DATA IN FIRST WRITE BUFFER CIRCUITRY
604

RECEIVE, VIA A SECOND PROCESSOR INTERFACE AND FROM A SECOND PROCESSOR, A SECOND MEMORY COMMAND TO WRITE SECOND DATA RECEIVED VIA THE SECOND PROCESSOR INTERFACE TO THE MEMORY DEVICE VIA THE MEMORY DEVICE INTERFACE
606

BASED ON THE SECOND MEMORY COMMAND, STORE, AT LEAST UNTIL THE SECOND DATA IS WRITTEN VIA THE MEMORY DEVICE INTERFACE, THE SECOND DATA IN SECOND WRITE BUFFER CIRCUITRY
608

RECEIVE, VIA THE FIRST PROCESSOR INTERFACE AND FROM THE FIRST PROCESSOR, A THIRD MEMORY COMMAND TO READ THE FIRST DATA FROM THE MEMORY DEVICE VIA THE MEMORY DEVICE INTERFACE
610

BASED ON THE THIRD COMMAND, TRANSMIT, VIA THE FIRST PROCESSOR INTERFACE AND TO THE FIRST PROCESSOR, THE FIRST DATA AS RETRIEVED FROM THE FIRST WRITE BUFFER CIRCUITRY
612

*FIG. 6*

MULTIPLE HOST MEMORY CONTROLLER

BRIEF DESCRIPTION OF THE DRAWINGS

FIG. 3 is a flowchart illustrating a method of operating a memory controller.

FIG. 4 is a flowchart illustrating a method of operating a memory controller with a write buffer.

FIG. 5 is a flowchart illustrating a method of operating a memory controller with a plurality of write buffers.

FIG. 6 is a flowchart illustrating a method of operating a memory controller with a plurality of write buffers.

DETAILED DESCRIPTION OF THE EMBODIMENTS

In an embodiment, multiple (e.g., two) hosts access a single memory channel (and/or device) via a memory controller. The single memory channel/device can support at most one access at a time. To reduce contention between the multiple hosts, the memory controller comprises multiple (e.g., two), independent, host ports. Each host port is associated with a write buffer(s) in the memory controller that stores write data at least until the memory controller writes the data to the memory channel. Data stored in a write buffer may be used to respond to memory access commands (e.g., reads or writes) on the ports without accessing the memory channel. In this manner, the hosts do not directly contend with each other for the single memory channel or the memory controller. In other words, the memory controller is able to receive and respond to memory access commands from multiple hosts without first requiring the hosts to contend with each other for access to an interface with the memory controller.

Figure 1:
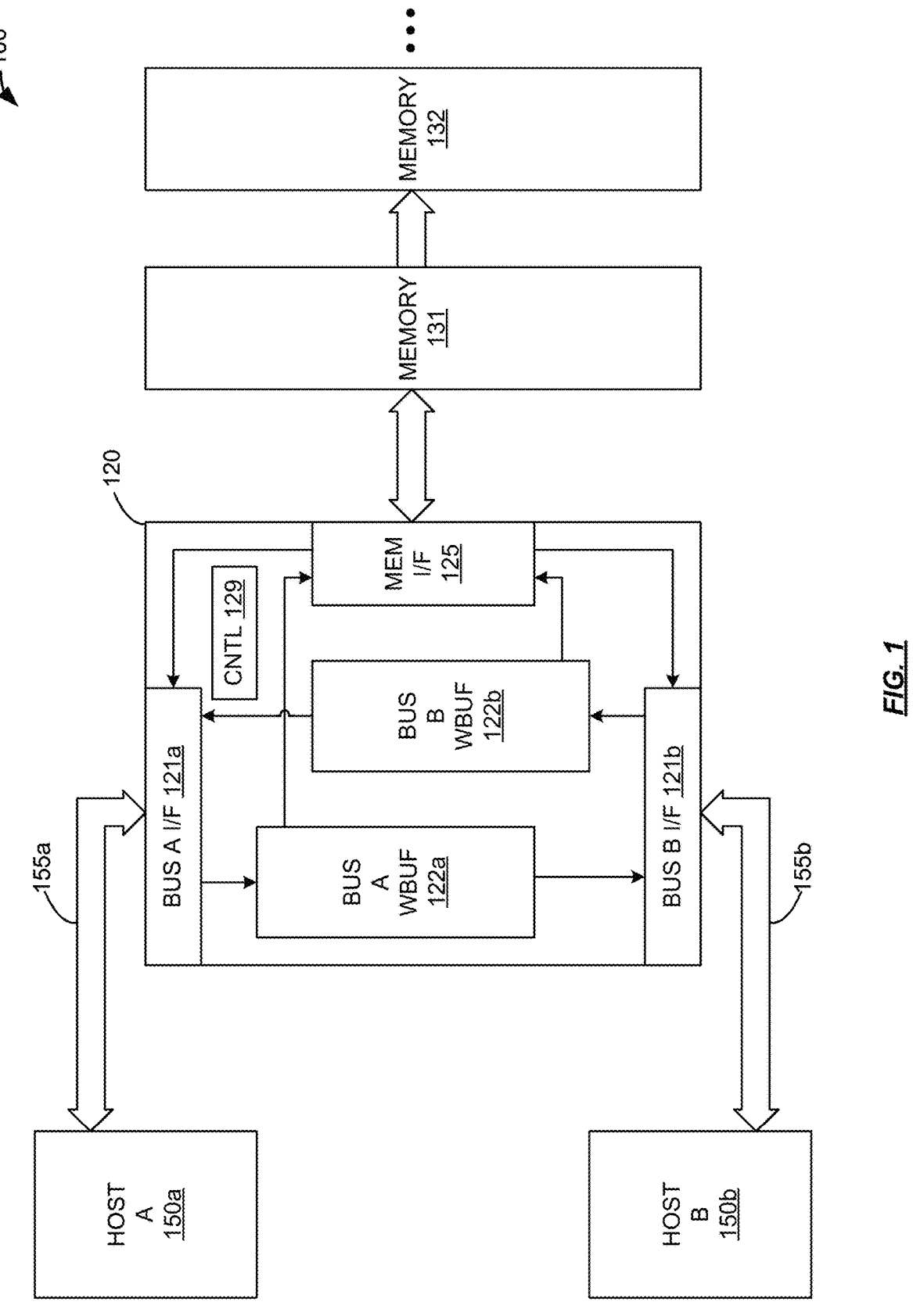
FIG. 1 is a block diagram illustrating a memory system.

FIG. 1 is a block diagram illustrating a memory system. In FIG. 1, memory system 100 comprises multiple host memory controller 120, memory devices 131-132, host A 150a, host B 150b, host bus A 155a, and host bus B 155b. Memory controller 120 includes bus A interface 121a, bus B interface 121b, bus A write buffer 122a, bus B write buffer 122b, memory device interface 125, and control circuitry 129. Host A 150a is operatively coupled to bus A interface 121a of controller 120 via host bus A 155a. Host B 150b is operatively coupled to bus B interface 121b of controller 120 via host bus B 155b. Memory device interface 125 of controller 120 is operatively coupled to memory devices 131-132.

In an embodiment, controller 120, and memory devices 131-132 are integrated circuit type devices, such as are commonly referred to as "chips". The controller functionality of a memory controller (such as the controller functionality of controller 120) manages the flow of data going to and from memory devices and/or memory modules. Memory devices 131-132 may be standalone devices, or may include multiple memory integrated circuit dies-such as components of a multi-chip module. A memory controller can be a separate, standalone chip, or integrated into another chip. For example, a memory controller may be included on a single die with a microprocessor, or included as part of a more complex integrated circuit system such as a block of a system on a chip (SoC). Hosts A-B 150a-150b may include integrated circuit devices and comprise one or more microprocessors, SoCs, and/or other chips (e.g., graphics processing unit-GPU).

Hosts A-B 150a-150b may comprise one or more processors that may be referred to as a "compute engine," "computing engine," "graphics processor," "rendering engine," "processing unit," "accelerator", "offload engine," and/or GPU. This processor may include and/or be a heterogeneous processing unit that includes the functions of one or more of a CPU, GPU, video processor, etc. This processor may include, or be, a serial-ATA (SATA), serial attached SCSI (SAS), eSATA, PATA, IEEE 1394, USB (all revisions), SCSI Ultra, FiberChannel, Infiniband, Thunderbolt, or other industry standard I/O interfaces (such as PCI-Express-PCIe). This processor may include, or be, a network processor unit (NPU) such as a TCP offload engine (TOE), a protocol translator (e.g., TCP over SATA, TCP over PCI-Express, accelerated SCSI interconnect, etc.), and/or a protocol packet translator. This processor may include, or be, a fixed function graphics processing unit, a digital signal processor (DSP), a signal path processor, a Fourier transform processor, an inverse Fourier transform processor, and/or a media format encoder/decoder (e.g., JPEG, DVX, AVI, MP2, MP3, MP4, Blu-ray, HD-DVD, DVD, etc.).

Memory devices 131-132 may be standalone devices, or may include multiple memory integrated circuit dies-such as components of a multi-chip module. Memory devices 131-132 can include multiple memory devices coupled together to form storage space. Memory devices 131-132 can include, but is not limited to, SRAM, DDR3, DDR4, DDR5, XDR, XDR2, GDDR3, GDDR4, GDDR5, LPDDR, and/or LPDDR2 and successor memory standards and technologies. Memory devices 131-132 can include a stack of devices such as a through-silicon-via (TSV) stack and/or a hybrid memory cube (HMC).

Bus A interface 121a of controller 120 is operatively coupled to bus A write buffer 122a, bus B write buffer 122b, and memory device interface 125. Bus B interface 121b of controller 120 is operatively coupled to bus B write buffer 122b, bus A write buffer 122a, and memory device interface 125. Bus A write buffer 122a is operatively coupled to bus A interface 121a, bus B interface 121b, and memory device interface 125. Bus B write buffer 122b is operatively coupled to bus B interface 121b, bus A interface 121a, and memory device interface 125.

Bus A interface 121a of controller 120 is operatively coupled to host A 150a to communicate at least commands, addresses, and data with host A 150a. Accordingly, bus A interface 121a comprises at least a first command interface to receive command from host A 150a, and a first data interface to transmit read data and receive write data, to/from host A 150a, via bus A 155a. Completion of the commands received from host A 150a may be controlled by control circuitry 129. Bus A interface 121a is operatively coupled to host A 150a to communicate read commands to be performed by one or more of memory device 131-132. Results of read commands may be communicated from one or more of memory device 131-132 to host A 150a via bus interface A 121a and host bus A 155a.

Similarly, bus B interface 121b of controller 120 is operatively coupled to host B 150b to communicate at least commands, addresses, and data with host B 150b. Accordingly, bus B interface 121b comprises at least a second command interface to receive command from host B 150b, and a second data interface to transmit read data and receive write data, to/from host B 150b, via host bus B 155b. Completion of these commands received from host B 150b may be controlled by control circuitry 129. Bus B interface 121*b* is operatively coupled to host B 150*b* to communicate read commands to be performed by one or more of memory device 131-132. Results of read commands may be communicated from one or more of memory device 131-132 to host B 150*b* via bus B interface 121*b* and host bus B 155*b*.

Bus A interface 121*a* is operatively coupled to host A 150*a* to communicate write commands to be performed by one or more of memory device 131-132. Write data associated with write commands may be communicated to one or more of memory device 131-132 from host A 150*a* via host bus A 155*a* and bus interface A 121*a*. Write data from host A 150*a* may be temporarily stored in bus A write buffer 122*a* (e.g., in association with a write address) before being written to one or more memory devices 131-132 via memory device interface 125. Write data from host A 150*a* may be temporarily stored in bus A write buffer 122*a* while memory devices 131-132 are busy performing other operations (e.g., previous read or write commands from either host A 150*a* or host B 150*b*).

Bus B interface 121*b* is operatively coupled to host B 150*b* to communicate write commands to be performed by one or more of memory device 131-132. Write data associated with write commands may be communicated to one or more of memory device 131-132 from host B 150*b* via host bus B 155*b* and bus B interface 121*b*. Write data from host B 150*b* may be temporarily stored in bus B write buffer 122*b* (e.g., in association with a write address) before being written to one or more memory devices 131-132 via memory device interface 125. Write data from host B 150*b* may be temporarily stored in bus B write buffer 122*b* while memory devices 131-132 are busy performing other operations (e.g., previous read or write commands from either host A 150*a* or host B 150*b*).

In an embodiment, control circuitry 129 may include arbitration/scheduling circuitry to determine an order that data from bus A write buffer 122*a* and bus B write buffer 122*b* is written to one or more memory device 131-132. For example, control circuitry 129 may write data from bus A write buffer 122*a* and bus B write buffer 122*b* in a first-in first-out manner. In other words, whichever of bus A write buffer 122*a* and bus B write buffer 122*b* is storing data from a write command received by controller 120 the longest time (or commands) in the past, is selected by control circuitry 129 to supply the data for the next write command communicated via memory device interface 125 to one or more memory devices 131-132. In another example, control circuitry 129 may select the one of bus A write buffer 122*a* and bus B write buffer 122*b* that is the most full to supply the data for the next write command communicated via memory device interface 125 to one or more memory devices 131-132. In other examples, control circuitry 129 may use one or more network/buffer/queue scheduling techniques such as fair queueing, weighted fair queueing, round robin, weighted round robin, random early detection, weighted random early detection, and the like.

In an embodiment, a read command from host A 150*a* may be addressed to data that is being temporarily stored in bus B write buffer 122*b*. The addressed data stored in bus B write buffer 122*b* may be stored in bus B write buffer 122*b* while waiting to be written to one or more of memory devices 131-132. In an embodiment, the addressed data stored in bus B write buffer 122*b* may be stored in bus B write buffer 122*b* after having been written to one or more of memory devices 131-132 but before having been evicted from, or overwritten in, bus B write buffer 122*b*. Controller 120 (under the control of control circuitry 129) may, in response to detecting that read data associated with a read command from host A 150*a* resides in bus B write buffer 122*b*, provide the read data to host A 150*a* from bus B write buffer 122*b*. In other words, controller 120 may provide the read data sought by a read command from host A 150*a* from bus B write buffer 122*b* rather than waiting for that read data to first be written to one or more memory device 131-132. Providing the read data sought by a read command from host A 150*a* from bus B write buffer 122*b* may reduce the number of accesses made to memory device 131-132 via memory device interface 125.

Similarly, in an embodiment, a read command from host B 150*b* may be addressed to data that is being temporarily stored in bus A write buffer 122*a*. The addressed data stored in bus A write buffer 122*a* may be stored in bus A write buffer 122*a* while waiting to be written to one or more of memory devices 131-132. In an embodiment, the addressed data stored in bus A write buffer 122*a* may be stored in bus A write buffer 122*a* after having been written to one or more of memory devices 131-132 but before having been evicted from, or overwritten in, bus A write buffer 122*a*. Controller 120 (under the control of control circuitry 129) may, in response to detecting that read data associated with a read command from host B 150*b* resides in bus A write buffer 122*a*, provide the read data to host B 150*b* from bus A write buffer 122*a*. In other words, controller 120 provides the read data sought by a read command from host B 150*b* from bus A write buffer 122*a* rather than waiting for that read data to first be written to one or more memory device 131-132. Providing the read data sought by a read command from host B 150*b* from bus A write buffer 122*a* may reduce the number of accesses made to memory device 131-132 via memory device interface 125.

In operation, for example, bus interface A 121*a* may receive, from host A 150*a* and via the command interface of bus interface A 121*a*, a first memory access command to write first data to one or more memory devices 131-132. This first data is received from host A 150*a* via the data interface bus interface A 121*a*. Based on the first memory access command, bus A write buffer 122*a* may store this first data at least until it is written to one or more memory devices 131-132. Bus B interface 121*b* may receive, from host B 150*b* and via the command interface of bus B interface 121*b*, a second memory access command to read the first data from one or more memory devices 131-132. However, control circuitry 129 may detect that the first data is stored in bus A write buffer 122*a* and based on this detection, cause the first data to be retrieved from bus A write buffer 122*a* and be transmitted to host B 150*b* via the data interface of bus B interface 121*b*.

Continuing the example, the command interface of bus B interface 121*b* may further receive, from host B 150*b*, a third memory access command to write second data to one or more memory devices 131-132. Based on the third memory access command, bus B write buffer 122*b* may store this second data at least until it is written to one or more memory devices 131-132. The command interface of bus B interface 121*b* may further receive, from host B 150*b*, a fourth memory access command to read the second data from one or more memory devices 131-132. Controller 120 may, in response to the fourth memory access command, retrieve the second data from bus B write buffer 122*b* and transmit it to host B 150*b* via the data interface of bus B interface 121*b*. Arbitration circuitry of control circuitry 129 may determine the order that the first data and the second data are written to one or more memory devices 131-132.

Figure 2:
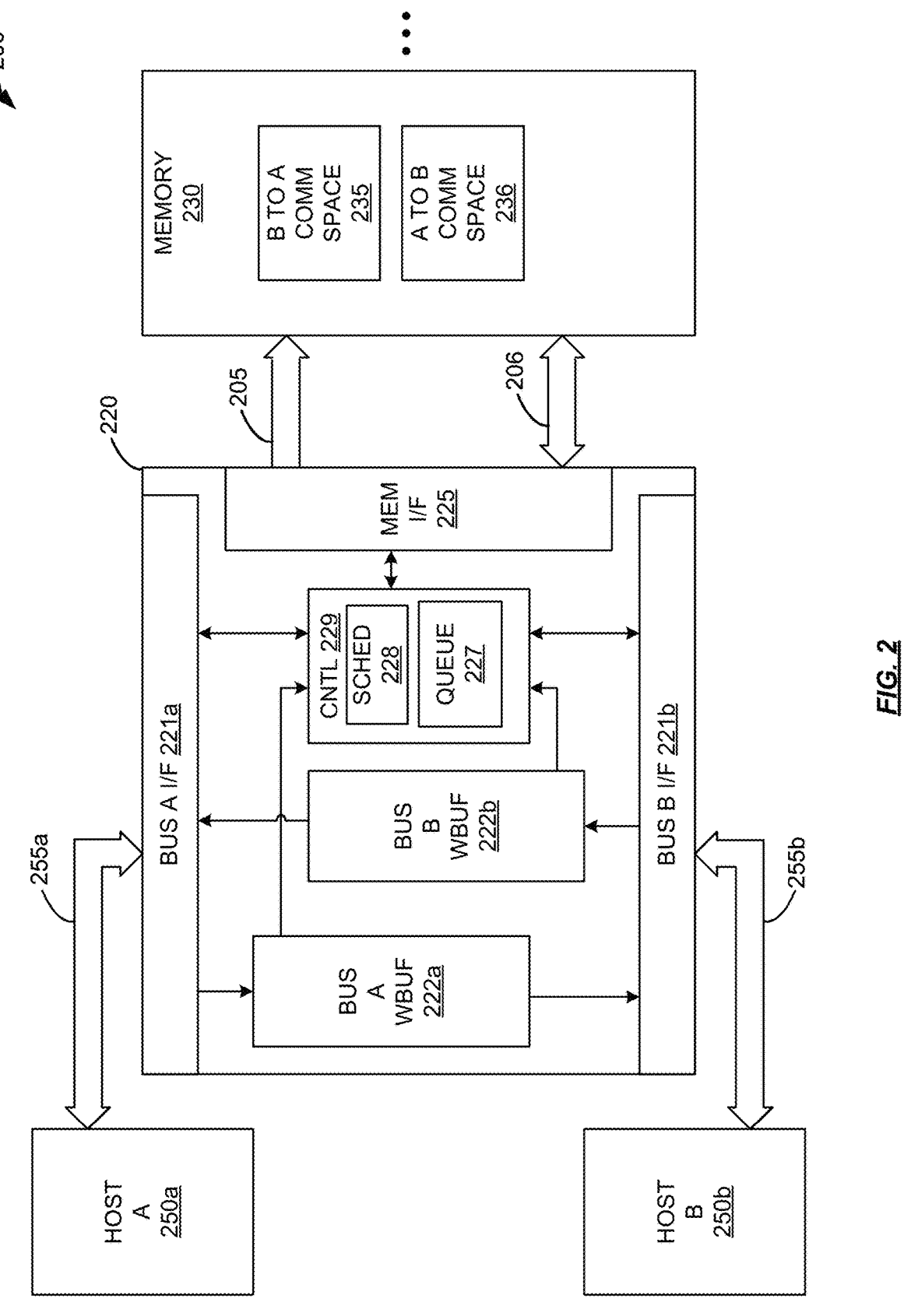
FIG. 2 is a block diagram illustrating a shared memory device memory system.

FIG. 2 is a block diagram illustrating a shared memory device memory system. In FIG. 2, memory system 200 comprises multiple host memory controller 220, memory device 230, host A 250a, host B 250b, host bus A 255a, and host bus B 255b. Memory controller 220 includes bus A interface 221a, bus B interface 221b, bus A write buffer 222a, bus B write buffer 222b, memory device interface 225, and control circuitry 229. Control circuitry 229 includes memory device command scheduler 228 and command queue 227. Host A 250a is operatively coupled to bus A interface 221a of controller 220 via host bus A 255a. Host B 250b is operatively coupled to bus B interface 221b of controller 220 via host bus B 255b. Memory device interface 225 of controller 220 is operatively coupled to memory device 230. Memory device 230 includes host B to host A communication allocation 235 and host A to host B communication allocation 236.

Bus A interface 221a of controller 220 is operatively coupled to bus A write buffer 222a, bus B write buffer 222b, and memory device interface 225. Bus B interface 221b of controller 220 is operatively coupled to bus B write buffer 222b, bus A write buffer 222a, and memory device interface 225. Bus A write buffer 222a is operatively coupled to bus A interface 221a, bus B interface 221b, and memory device interface 225. Bus B write buffer 222b is operatively coupled to bus B interface 221b, bus A interface 221a, and memory device interface 225.

Bus A interface 221a of controller 220 is operatively coupled to host A 250a to communicate at least commands, addresses, and data with host A 250a. Accordingly, bus A interface 221a comprises at least a first command interface to receive command from host A 250a, and a first data interface to transmit read data and receive write data, to/from host A 250a, via bus A 255a. Completion of the commands received from host A 250a may be controlled by control circuitry 229. Bus A interface 221a is operatively coupled to host A 250a to communicate read commands to be performed by memory device 230. Results of read commands may be communicated from memory device 230 to host A 250a via bus interface A 221a and host bus A 255a.

Similarly, bus B interface 221b of controller 220 is operatively coupled to host B 250b to communicate at least commands, addresses, and data with host B 250b. Accordingly, bus B interface 221b comprises at least a second command interface to receive command from host B 250b, and a second data interface to transmit read data and receive write data, to/from host B 250b, via host bus B 255b. Completion of these commands received from host B 250b may be controlled by control circuitry 229. Bus B interface 221b is operatively coupled to host B 250b to communicate read commands to be performed by memory device 230. Results of read commands may be communicated from memory device 230 to host B 250b via bus B interface 221b and host bus B 255b.

Bus A interface 221a is operatively coupled to host A 250a to communicate write commands to be performed by memory device 230. Write data associated with write commands may be communicated to memory device 230 from host A 250a via host bus A 255a and bus interface A 221a. Write data from host A 250a may be temporarily stored in bus A write buffer 222a (e.g., in association with a write address) before being written to memory device 230 via memory device interface 225. Write data from host A 250a may be temporarily stored in bus A write buffer 222a while memory device 230 is busy performing other operations (e.g., previous read or write commands from either host A 250a or host B 250b).

Bus B interface 221b is operatively coupled to host B 250b to communicate write commands to be performed by memory device 230. Write data associated with write commands may be communicated to memory device 230 from host B 250b via host bus B 255b and bus B interface 221b. Write data from host B 250b may be temporarily stored in bus B write buffer 222b (e.g., in association with a write address) before being written to memory device 230 via memory device interface 225. Write data from host B 250b may be temporarily stored in bus B write buffer 222b while memory device 230 is busy performing other operations (e.g., previous read or write commands from either host A 250a or host B 250b).

Control circuitry 229 includes memory device command scheduler 228 and command queue 227. Memory device command scheduler 228 and command queue 227 cooperate to determine an order for commands that read data from memory device 230, write data to memory device 230 from bus A write buffer 222a, and write data to memory device 230 from bus B write buffer 222b. For example, memory device command scheduler 228 may place command indicators into command queue 227 based on a first-in first-out scheduling technique. In other words, the order that host A 250a and host B 250b request memory device 230 commands (read or write) from controller 220 is the order that these commands are placed in command queue 227 and the order these commands are sent to memory device 230. In another example, control circuitry 229 selects read commands until a one of bus A write buffer 222a and bus B write buffer 222b reaches a threshold utilization. Then, the one of bus A write buffer 222a and bus B write buffer 222b that is the most full is scheduled for a command to supply the data for a next write command placed in command queue 227. In other examples, memory device command scheduler 228 may use one or more network/buffer/queue scheduling techniques such as fair queueing, weighted fair queueing, round robin, weighted round robin, random early detection, weighted random early detection, and the like.

In an embodiment, control circuitry 229 includes circuitry configured to associate at least one address range in memory device 230 with communication between the first processor and the second processor. As shown in FIG. 2, two such address ranges are illustrated: host B to host A communication allocation 235 and host A to host B communication allocation 236. In an embodiment, memory device command scheduler 228 may prioritize read transactions from allocations 235-236 in order to increase the likelihood that those read transaction will be satisfied from a respective write buffer 222a-222b. In an embodiment, memory device command scheduler 228 may deprioritize write transactions to allocations 235-236 in order to increase the likelihood that read transactions from allocations 235-236 will be satisfied from a respective write buffer 222a-222b.

In an embodiment, a read command from host A 250a may be addressed to data that is being temporarily stored in bus B write buffer 222b. The addressed data stored in bus B write buffer 222b may be stored in bus B write buffer 222b while waiting to be written to memory device 230. In an embodiment, the addressed data stored in bus B write buffer 222b may be stored in bus B write buffer 222b after having been written to memory device 230 but before having been evicted from, or overwritten in, bus B write buffer 222b. Controller 220 (under the control of control circuitry 229) may, in response to detecting that read data associated with a read command from host A 250a resides in bus B write buffer 222b, provide the read data to host A 250a from bus B write buffer 222b. In other words, controller 220 may provide the read data sought by a read command from host A 250a from bus B write buffer 222b rather than waiting for that read data to first be written to memory device 230. Providing the read data sought by a read command from host A 250a from bus B write buffer 222b may reduce the number of accesses made to memory device 230 via memory device interface 225.

Similarly, in an embodiment, a read command from host B 250b may be addressed to data that is being temporarily stored in bus A write buffer 222a. The addressed data stored in bus A write buffer 222a may be stored in bus A write buffer 222a while waiting to be written to memory device 230. In an embodiment, the addressed data stored in bus A write buffer 222a may be stored in bus A write buffer 222a after having been written to memory device 230 but before having been evicted from, or overwritten in, bus A write buffer 222a. Controller 220 (under the control of control circuitry 229) may, in response to detecting that read data associated with a read command from host B 250b resides in bus A write buffer 222a, provide the read data to host B 250b from bus A write buffer 222a. In other words, controller 220 may provide the read data sought by a read command from host B 250b from bus A write buffer 222a rather than waiting for that read data to first be written to memory device 230. Providing the read data sought by a read command from host B 250b from bus A write buffer 222a may reduce the number of accesses made to memory device 230 via memory device interface 225.

In operation, for example, bus interface A 221a may receive, from host A 250a and via the command interface of bus interface A 221a, a first memory access command to write first data to memory device 230. This first data is received from host A 250a via the data interface bus interface A 221a. Based on the first memory access command, bus A write buffer 222a may store this first data at least until it is written to memory device 230. Bus B interface 221b may receive, from host B 250b and via the command interface of bus B interface 221b, a second memory access command to read the first data from memory device 230. However, control circuitry 229 may detect that the first data is stored in bus A write buffer 222a and, based on this detection, cause the first data to be retrieved from bus A write buffer 222a and be transmitted to host B 250b via the data interface of bus B interface 221b.

Continuing the example, the command interface of bus B interface 221b may further receive, from host B 250b, a third memory access command to write second data to memory device 230. Based on the third memory access command, bus B write buffer 222b may store this second data at least until it is written to memory device 230. The command interface of bus B interface 221b may further receive, from host B 250b, a fourth memory access command to read the second data from memory device 230. Controller 220 may, in response to the fourth memory access command, retrieve the second data from bus B write buffer 222b and transmit it to host B 250b via the data interface of bus B interface 221b. Arbitration circuitry of control circuitry 229 may determine the order that the first data and the second data are written to memory device 230.

FIG. 3 is a flowchart illustrating a method of operating a memory controller. One or more steps illustrated in FIG. 3 may be performed by, for example, memory system 100, memory system 200, and/or their components. Via a first processor interface and from a first processor, a first memory command to write first data received via the first processor interface to a memory device is received (302). For example, via bus A interface 121a, controller 120 may receive, from host A 150a, a first write command to write first data, also received via bus A interface 121a, to memory device 131.

Based on the first memory command, the first data is stored in first write buffer circuitry at least until the first data is written to the memory device (304). For example, based on the first write command, controller 120 may store the first write data in bus A write buffer 122a at least until the first write data is stored, via memory device interface 125 and by controller 120, in memory device 131. Via a second processor interface and from a second processor, a second memory command to read the first data is received (306). For example, via bus B interface 121b, controller 120 may receive, from host B 150b, a read command to read the first data (i.e., a read command directed to the address in memory device 131 that the first write data is to be written to).

The first data is retrieved from the first write buffer circuitry (308). For example, based on detecting (e.g., by control circuitry 129) that the data addressed by the read command from host B 150b resides in bus A write buffer 122a, controller 120 may retrieve the first data from bus A write buffer 122a rather than initiating a write command to flush the first data from bus A write buffer 122a to memory device 131 followed by a read command to memory device 131 to read the first data from memory device 131. The first data retrieved from the first write buffer circuitry is transmitted to the second processor via the second processor interface (310). For example, controller 120 may transmit the first data that was retrieved from bus A write buffer 122a to host B 150b via bus B interface 121b.

FIG. 4 is a flowchart illustrating a method of operating a memory controller with a write buffer. One or more steps illustrated in FIG. 4 may be performed by, for example, memory system 100, memory system 200, and/or their components. By a controller and from a first processor, a first memory access command to write first data to a memory device is received, wherein the first data is received via a first data interface (402). For example, controller 120 may receive from host A 150a and via the command interface of host A interface 121a, a write command to write first data at a first address in memory device 131, wherein the first data is received via the data interface of host A interface 121a.

By the controller and in first write buffer circuitry, the first data is stored at least until the first data is written to a memory device by the controller (404). For example, controller 120 may store, in bus A write buffer 122a, the first data. Controller 120 may store the first data in bus A write buffer 122a at least until controller 120 a stores the first data at the first address in memory device 131.

By a controller and from a second processor, a second memory access command to read the first data from the memory device is received (406). For example, controller 120 may receive from host B 150b and via the command interface of bus B interface 121b, a read command to read the data at the first address in memory device 131. From the first write buffer circuitry and without accessing the memory device to read the first data, the first data is retrieved from the first write buffer circuitry (408). For example, controller 120 may, without accessing memory device 131 to read the data at the first address in memory device 131, retrieve the first data from bus A write buffer 122a. The first data is transmitted by the controller to the second processor (410). For example, controller 120 may transmit, via bus B interface 121b, the first data as retrieved from bus A write buffer 122a.

FIG. 5 is a flowchart illustrating a method of operating a memory controller with a plurality of write buffers. One or more steps illustrated in FIG. 5 may be performed by, for example, memory system 100, memory system 200, and/or their components. Via a first processor interface and from a first processor, a first memory command is received to write first data received via the first processor interface to a memory device via a memory device interface (502). For example, via the command interface of bus interface A 121*a* and from host A 150*a*, controller 120 may receive a first memory command to write first data received via the data interface of bus interface A 121*a* to memory device 131 via memory device interface 125. Based on the first memory command and at least until the first data is written via the memory device interface, the first data is stored in first write buffer circuitry (504). For example, based on the first memory command to write the first data to memory device 131, controller 120 may store the first data in bus A write buffer 122*a* at least until controller 120 completes the writing of the first data to memory device 131 via memory device interface 125.

Via a second processor interface and from a second processor, a second memory command is received to write second data received via the second processor interface to the memory device via the memory device interface (506). For example, via the command interface of bus B interface 121*b* and from host B 150*b*, controller 120 may receive a second memory command to write second data received via the data interface of bus B interface 121*b* to memory device 131 via memory device interface 125. Based on the second memory command and at least until the second data is written via the memory device interface, the second data is stored in second write buffer circuitry (508). For example, based on the second memory command to write the second data to memory device 131, controller 120 may store the second data in bus B write buffer 122*b* at least until controller 120 completes the writing of the second data to memory device 131 via memory device interface 125.

Via the second processor interface and from the second processor, a third memory command is received to read the first data from the memory device via the memory device interface (510). For example, controller 120 may receive, from host B 150*b* and via bus B interface 121*b*, a read command to read memory device 131 via memory device interface 125 in order to receive the first data from memory device 131 (i.e., read the address where the first data is to be, or is, stored). Based on the third command, via the second processor interface, and to the second processor, the first data is transmitted to the second processor as retrieved from the first write buffer circuitry (512). For example, based on the read command from host B 150*b* to read the first data from memory device 131, controller 120 may transmit the first data as retrieved from bus A write buffer 122*a* to host B 150*b* via bus B interface 121*b*.

FIG. 6 is a flowchart illustrating a method of operating a memory controller with a plurality of write buffers. One or more steps illustrated in FIG. 6 may be performed by, for example, memory system 100, memory system 200, and/or their components. Via a first processor interface and from a first processor, a first memory command is received to write first data received via the first processor interface to a memory device via a memory device interface (602). For example, via the command interface of bus interface A 121*a* and from host A 150*a*, controller 120 may receive a first memory command to write first data received via the data interface of bus interface A 121*a* to memory device 131 via memory device interface 125. Based on the first memory command and at least until the first data is written via the memory device interface, the first data is stored in first write buffer circuitry (604). For example, based on the first memory command to write the first data to memory device 131, controller 120 may store the first data in bus A write buffer 122*a* at least until controller 120 completes the writing of the first data to memory device 131 via memory device interface 125.

Via a second processor interface and from a second processor, a second memory command is received to write second data received via the second processor interface to the memory device via the memory device interface (606). For example, via the command interface of bus B interface 121*b* and from host B 150*b*, controller 120 may receive a second memory command to write second data received via the data interface of bus B interface 121*b* to memory device 131 via memory device interface 125. Based on the second memory command and at least until the second data is written via the memory device interface, the second data is stored in second write buffer circuitry (608). For example, based on the second memory command to write the second data to memory device 131, controller 120 may store the second data in bus B write buffer 122*b* at least until controller 120 completes the writing of the second data to memory device 131 via memory device interface 125.

Via the first processor interface and from the first processor, a third memory command is received to read the first data from the memory device via the memory device interface (610). For example, controller 120 may receive, from host A 150*a* and via bus A interface 121*a*, a read command to read memory device 131 via memory device interface 125 in order to receive the first data from memory device 131 (i.e., read the address where the first data is to be, or is, stored). Based on the third command, via the first processor interface, and to the first processor, the first data is transmitted to the first processor as retrieved from the first write buffer circuitry (612). For example, based on the read command from host A 150*a* to read the first data from memory device 131, controller 120 may transmit the first data as retrieved from bus A write buffer 122*a* to host A 150*a* via bus A interface 121*a*.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of memory system 100, memory system 200, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 7:
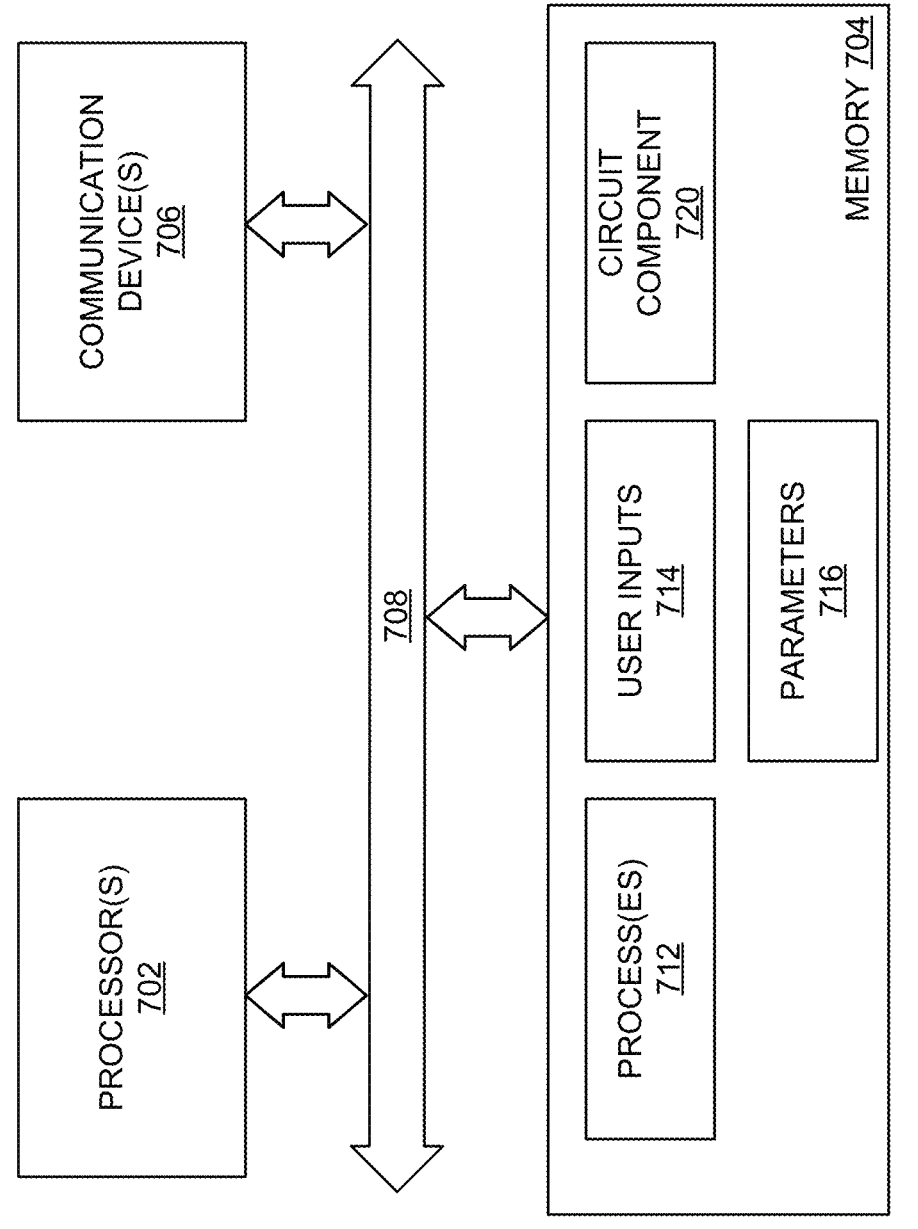
FIG. 7 is a block diagram of a processing system.

FIG. 7 is a block diagram illustrating one embodiment of a processing system 700 for including, processing, or generating, a representation of a circuit component 720. Processing system 700 includes one or more processors 702, a memory 704, and one or more communications devices 706. Processors 702, memory 704, and communications devices 706 communicate using any suitable type, number, and/or configuration of wired and/or wireless connections 708.

Processors 702 execute instructions of one or more processes 712 stored in a memory 704 to process and/or generate circuit component 720 responsive to user inputs 714 and parameters 716. Processes 712 may be any suitable electronic design automation (EDA) tool or portion thereof used to design, simulate, analyze, and/or verify electronic circuitry and/or generate photomasks for electronic circuitry. Representation 720 includes data that describes all or portions of memory system 100, memory system 200, and their components, as shown in the Figures.

Representation 720 may include one or more of behavioral, register transfer, logic component, transistor, and layout geometry-level descriptions. Moreover, representation 720 may be stored on storage media or communicated by carrier waves.

Data formats in which representation 720 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 714 may comprise input parameters from a keyboard, mouse, voice recognition interface, microphone and speakers, graphical display, touch screen, or other type of user interface device. This user interface may be distributed among multiple interface devices. Parameters 716 may include specifications and/or characteristics that are input to help define representation 720. For example, parameters 716 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 704 includes any suitable type, number, and/or configuration of non-transitory computer-readable storage media that stores processes 712, user inputs 714, parameters 716, and circuit component 720.

Communications devices 706 include any suitable type, number, and/or configuration of wired and/or wireless devices that transmit information from processing system 700 to another processing or storage system (not shown) and/or receive information from another processing or storage system (not shown). For example, communications devices 706 may transmit circuit component 720 to another system. Communications devices 706 may receive processes 712, user inputs 714, parameters 716, and/or circuit component 720 and cause processes 712, user inputs 714, parameters 716, and/or circuit component 720 to be stored in memory 704.

Implementations discussed herein include, but are not limited to, the following examples:

Example 1: A memory controller, comprising: a memory interface to access at least one memory device coupled to the memory interface; a first command interface to receive, from a first processor, a first memory access command to write first data to the at least one memory device, the first data to be received from the first processor via a first data interface; first write buffer circuitry to, based on the first memory access command, store the first data at least until the first data is written to the at least one memory device; and a second command interface to receive, from a second processor, a second memory access command to read the first data from the at least one memory device, the first data to be retrieved from the first write buffer circuitry and transmitted to the second processor via a second data interface.

Example 2: The memory controller of example 1, wherein the second command interface is to receive, from the second processor, a third memory access command to write second data to the at least one memory device.

Example 3: The memory controller of example 2, further comprising: second write buffer circuitry to, based on the third memory access command, store the second data at least until the second data is written to the at least one memory device.

Example 4: The memory controller of example 3, wherein the second command interface is to receive, from the second processor, a fourth memory access command to read the second data from the at least one memory device, the second data to be retrieved from the second write buffer circuitry and transmitted to the second processor via the second data interface.

Example 5: The memory controller of example 4, further comprising: arbitration circuitry to determine an order that the first data and the second data are to be written to the at least one memory device.

Example 6: The memory controller of example 5, further comprising: circuitry configured to associate at least one address range in the at least one memory device with communication between the first processor and the second processor.

Example 7: The memory controller of example 6, wherein the first command interface is to receive, from the first processor, a fifth memory access command to read the first data from the at least one memory device, the first data to be retrieved from the first write buffer circuitry and transmitted to the first processor via the first data interface.

Example 8: A memory controller, comprising: a first processor interface to receive, from a first processor, a first memory command to write first data, received via the first processor interface, to a memory device; first write buffer circuitry to, based on the first memory command, store the first data at least until the first data is written to the memory device; and a second processor interface to receive, from a second processor, a second memory command to read second data, received via the first processor interface, from the memory device, the memory controller to retrieve the second data from the first write buffer circuitry and to transmit the second data retrieved from the first write buffer circuitry to the second processor via the second processor interface.

Example 9: The memory controller of example 8, wherein the second processor interface is to receive, from the second processor, a third memory command to write third data to the memory device.

Example 10: The memory controller of example 9, further comprising: second write buffer circuitry to, based on the third memory command, store the third data at least until the third data is written to the memory device.

Example 11: The memory controller of example 10, wherein the first processor interface is to receive, from the first processor, a fourth memory access command to read fourth data from the memory device, the fourth data to be retrieved from the second write buffer circuitry and transmitted to the first processor via the first processor interface.

Example 12: The memory controller of example 11, further comprising: arbitration circuitry to determine an order that the first data and the third data are to be written to the memory device.

Example 13: The memory controller of example 12, further comprising: circuitry configured to associate at least one address range in the memory device with communication between the first processor and the second processor.

Example 14: The memory controller of example 13, wherein the first processor interface is to receive, from the first processor, a fifth memory access command to read the first data from the memory device, the first data to be retrieved from the first write buffer circuitry and transmitted to the first processor via the first processor interface.

Example 15: A method of operating a memory controller, comprising: receiving, via a first processor interface and from a first processor, a first memory command to write first data received via the first processor interface, to a memory device; based on the first memory command, storing, at least until the first data is written to the memory device, the first data in first write buffer circuitry; receiving, via a second processor interface and from a second processor, a second memory command to read the first data; retrieving the first data from the first write buffer circuitry; and transmitting the first data retrieved from the first write buffer circuitry to the second processor via the second processor interface.

Example 16: The method of example 15, further comprising: receiving, via the second processor interface and from the second processor, a third memory command to write second data to the memory device.

Example 17: The method example 16, further comprising: based on the third memory command, storing, at least until the second data is written to the memory device, the second data in second write buffer circuitry.

Example 18: The method of example 17, further comprising: receiving, from the first processor and via the first processor interface, a fourth memory command to read the second data from the memory device.

Example 19: The method of example 18, further comprising: based on the fourth memory command, retrieving the second data from the second write buffer circuitry.

Example 20: The method of example 19, further comprising: transmitting, to the first processor via the first processor interface, the second data retrieved from the second write buffer circuitry.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A controller, comprising:
a first processor interface to receive a first memory command to write first data received via the first processor interface via a memory device interface;
a second processor interface to receive a second memory command to write second data received via the second processor interface via the memory device interface, and to receive a third memory command to read the first data;
first write buffer circuitry associated with the first processor interface to, based on the first memory command, store the first data at least until the first data is written via the memory device interface;
second write buffer circuitry associated with the second processor interface to, based on the second memory command, store the second data at least until the second data is written via the memory device interface; and
circuitry to, based on the third memory command, retrieve the first data from the first write buffer circuitry without accessing a memory device via the memory device interface in response to the third memory command and to transmit the first data via the second processor interface.

2. The controller of claim 1, wherein the second processor interface is to receive a fourth memory command to read the second data.

3. The controller of claim 2, wherein, based on the fourth memory command, the second data is retrieved from the second write buffer circuitry.

4. The controller of claim 3, wherein, based on the fourth memory command, the second data is transmitted via the second processor interface.

5. The controller of claim 4, further comprising:
circuitry to determine an order that the first data and the second data are written via the memory device interface.

6. A controller, comprising:
first write buffer circuitry associated with a first processor interface to store first data received via the first processor interface;
second write buffer circuitry associated with a second processor interface to store second data received via the second processor interface; and
the first processor interface to receive a first command via the first processor interface that retrieves the second data from the second write buffer circuitry and transmits the second data via the first processor interface without accessing a memory device via a memory device interface of the controller in response to the first command.

7. The controller of claim 6, wherein the second processor interface is to receive a second command that retrieves the first data from the first write buffer circuitry.

8. The controller of claim 7, further comprising:
arbitration circuitry to determine an order that the first data and the second data are to be transmitted via the memory device interface.

9. The controller of claim 6, wherein the first processor interface is to receive a third command that retrieves the first data from the first write buffer circuitry.

10. The controller of claim 6,
wherein the memory device interface is to transmit the first data.

11. The controller of claim 10, wherein the memory device interface is to transmit the second data.

12. The controller of claim 6, wherein the first processor interface is to transmit the second data before the second data is transmitted via the memory device interface.

13. The controller of claim 6, wherein the second processor interface is to transmit the first data as retrieved from the first write buffer circuitry without accessing the memory device via the memory device interface.

14. A method of operating a controller, comprising:

via a first processor interface, receiving a first memory command to write first data received via the first processor interface via a memory device interface;

via a second processor interface, receiving a second memory command to read the first data and receiving a third memory command to write second data received via the second processor interface via the memory device interface;

based on the first memory command, storing, in first write buffer circuitry associated with the first processor interface, the first data at least until the first data is written via the memory device interface;

based on the second memory command, retrieving the first data from the first write buffer circuitry without accessing a memory device via the memory device interface in response to the second memory command;

based on the second memory command, transmitting the first data via the second processor interface; and based on the third memory command, storing, in second write buffer circuitry associated with the second processor interface, the second data at least until the second data is written via the memory device interface.

15. The method of claim 14, further comprising:

via the first processor interface, receiving a fourth-memory command to read the second data.

16. The method of claim 15, further comprising:

based on the fourth memory command, retrieving the second data from the second write buffer circuitry without accessing the memory device via the memory device interface in response to the fourth memory command.

17. The method of claim 16, further comprising:

via the second processor interface, receiving a fifth memory command to read third data.

18. The method of claim 17, further comprising:

based on the fifth memory command, retrieving the third data from the memory device via the memory device interface.

* * * * *